(12) United States Patent
Sakakura et al.

(10) Patent No.: US 11,987,245 B2
(45) Date of Patent: May 21, 2024

(54) METHOD FOR CONTROLLING VEHICLE AND VEHICLE CONTROL DEVICE

(71) Applicants: Nissan Motor Co., Ltd., Yokohama (JP); Renault S.A.S., Boulogne-Billancourt (FR)

(72) Inventors: Reo Sakakura, Kanagawa (JP); Susumu Fujita, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 264 days.

(21) Appl. No.: 17/776,489

(22) PCT Filed: Nov. 15, 2019

(86) PCT No.: PCT/IB2019/001272
§ 371 (c)(1),
(2) Date: May 12, 2022

(87) PCT Pub. No.: WO2021/094802
PCT Pub. Date: May 20, 2021

(65) Prior Publication Data
US 2022/0402492 A1 Dec. 22, 2022

(51) Int. Cl.
*B60W 30/165* (2020.01)
*G06V 20/58* (2022.01)

(52) U.S. Cl.
CPC ......... *B60W 30/165* (2013.01); *G06V 20/584* (2022.01); *B60W 2420/403* (2013.01); *B60W 2552/10* (2020.02); *B60W 2554/4041* (2020.02); *B60W 2554/801* (2020.02);
(Continued)

(58) Field of Classification Search
CPC ......... B60W 30/165; B60W 2420/403; B60W 2552/10; B60W 2554/4041; B60W 2554/801; B60W 2554/802; B60W 2555/60; B60W 2556/40; B60W 2554/4048; B60W 2754/20; B60W 2754/30; B60W 30/16; G06V 20/584
See application file for complete search history.

(56) References Cited

U.S. PATENT DOCUMENTS

| 2015/0105989 A1 | 4/2015 | Lueke et al. |
| 2019/0130198 A1 | 5/2019 | Hayashi |

FOREIGN PATENT DOCUMENTS

| JP | 2007-320458 A | 12/2007 |
| JP | 2009-001245 A | 1/2009 |
| JP | 2015-125708 A | 7/2015 |

(Continued)

*Primary Examiner* — Alan D Hutchinson
(74) *Attorney, Agent, or Firm* — Young Basile Hanlon & MacFarlane, P.C.

(57) ABSTRACT

A method for controlling a vehicle including: based on map information including information of an installation position of a traffic light and information of a lane controlled by the traffic light and a range of the angle of view of a camera mounted on the own vehicle, calculating an imaging-enabled area in which an image of the traffic light can be captured on the lane by the camera; determining whether or not the own vehicle is positioned in the imaging-enabled area; and when the own vehicle is positioned in the imaging-enabled area, controlling the own vehicle in such a way that the traffic light is not shielded from the range of the angle of view of the camera by a preceding vehicle of the own vehicle.

10 Claims, 12 Drawing Sheets

(52) U.S. Cl.
CPC ... *B60W 2554/802* (2020.02); *B60W 2555/60* (2020.02); *B60W 2556/40* (2020.02)

(56) References Cited

FOREIGN PATENT DOCUMENTS

| | | |
|---|---|---|
| JP | 2016-501408 A | 1/2016 |
| JP | 2016-049933 A | 4/2016 |
| JP | 2017-154512 A | 9/2017 |
| JP | 2019-046136 A | 3/2019 |
| JP | 2019-079126 A | 5/2019 |
| JP | 2019-079398 A | 5/2019 |

METHOD FOR CONTROLLING VEHICLE AND VEHICLE CONTROL DEVICE

TECHNICAL FIELD

The present invention relates to a method for controlling a vehicle and a vehicle control device.

BACKGROUND

In JP 2019-79126 A cited below, a technology for identifying a traffic light and simultaneously determining a lighting color of the traffic light by analyzing an image having imaged the front of the own vehicle and, based on a determination result, controlling autonomous driving of the own vehicle is described.

SUMMARY

However, when a preceding vehicle traveling in front of the own vehicle exists, the range of the angle of view (imaging range) of an image capturing means is shielded by the preceding vehicle, which sometimes causes a traffic light to be prevented from being recognized from a captured image. On the other hand, when the own vehicle is controlled in such a way as to constantly maintain sufficient inter-vehicle distance between the own vehicle and the preceding vehicle in order to prevent the traffic light from being shielded from the range of the angle of view of the image capturing means, there is a possibility that the inter-vehicle distance becomes needlessly large, which gives a sense of discomfort to a passenger of the own vehicle.

An object of the present invention is to, in autonomous driving based on a result of recognition of a traffic light from a captured image, prevent control for avoiding a traffic light from being shielded from a range of the angle of view of a camera by a preceding vehicle from being unnecessarily performed.

According to an aspect of the invention, there is provided a method for controlling a vehicle in which a camera configured to capture an image of a predetermined range of an angle of view in front of an own vehicle is mounted on the own vehicle and a traffic light is recognized based on an image captured by the camera, the method including: based on map information including information of an installation position of the traffic light and information of a lane controlled by the traffic light and a range of the angle of view of the camera mounted on the own vehicle, calculating an imaging-enabled area in which an image of the traffic light can be captured on the lane by the camera; determining whether or not the own vehicle is positioned in the imaging-enabled area; and when the own vehicle is positioned in the imaging-enabled area, controlling the own vehicle in such a way that the traffic light is not shielded from the range of the angle of view of the camera by a preceding vehicle of the own vehicle.

According to an aspect of the present invention, it is possible to, in autonomous driving based on a result of recognition of a traffic light from a captured image, prevent control for avoiding a traffic light from being shielded from a range of the angle of view of a camera by a preceding vehicle from being unnecessarily performed. The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION

Figure 1:
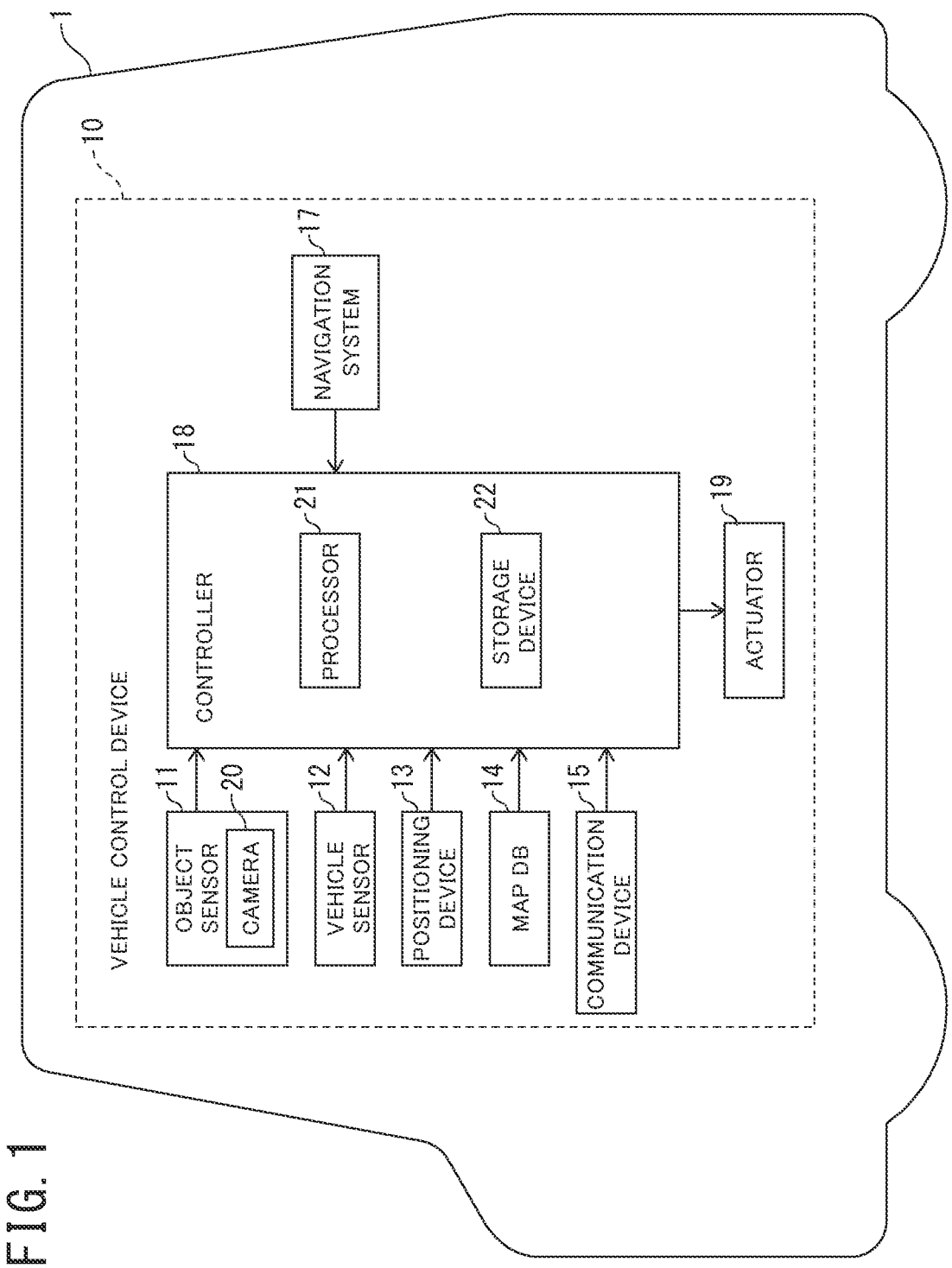
FIG. 1 is a schematic configuration diagram of a vehicle control device of an embodiment.

An embodiment of the present invention will now be described with reference to the drawings.

Configuration

An own vehicle 1 includes a vehicle control device 10 configured to automatically control traveling of the own vehicle 1. The vehicle control device 10 detects a self-position of the own vehicle 1, which is a current position of the own vehicle 1, and assists driving of the own vehicle 1 by controlling traveling of the own vehicle 1, based on the detected self-position. For example, based on the detected self-position and a travel environment around the own vehicle 1, the vehicle control device 10 assists driving by performing autonomous travel control causing the own vehicle 1 to self-drive without involvement of a driver.

The vehicle control device 10 may assist driving by controlling only acceleration and deceleration, based on the estimated self-position and a travel environment around the own vehicle 1. For example, the vehicle control device 10 may perform constant speed travel control that causes the own vehicle 1 to, when no preceding vehicle exists, travel while maintaining a set speed and, when a preceding vehicle traveling at a speed less than the set speed exists, travel in such a way as to follow the preceding vehicle. The vehicle control device 10 may control inter-vehicle distance to a preceding vehicle according to vehicle speed of the own vehicle 1.

The vehicle control device 10 includes object sensors 11, vehicle sensors 12, a positioning device 13, a map database 14, a communication device 15, a navigation system 17, a controller 18, and actuators 19. The map database is referred to as "map DB" in the drawings.

The object sensors 11 include a plurality of sensors of different types that are configured to detect objects around the own vehicle 1. For example, the object sensors 11 include a camera 20 mounted on the own vehicle 1. The camera 20 captures an image within a predetermined range of the angle of view (imaging range) in front of the own vehicle 1 and outputs the captured image to the controller 18. Note that, in the following description, "imaging" is also described as "image capturing" and the terms are used, assuming that the terms represent the same meaning herein. The object sensors 11 may include a range sensor, such as a laser radar, a millimeter-wave radar, and a light detection and ranging or laser imaging detection and ranging (LIDAR).

The vehicle sensors 12 are mounted on the own vehicle 1 and detect various information (vehicle signals) that is acquired from the own vehicle 1. The vehicle sensors 12 include, for example, a vehicle speed sensor configured to detect traveling speed (vehicle speed) of the own vehicle 1, wheel speed sensors configured to detect rotational speed of respective tires that the own vehicle 1 has, a triaxial acceleration sensor (G sensor) configured to detect acceleration (including deceleration) in three axial directions of the own vehicle 1, a steering angle sensor configured to detect a steering angle (including a turning angle), a gyro sensor configured to detect angular velocity generated in the own vehicle 1, a yaw rate sensor configured to detect a yaw rate, an accelerator sensor configured to detect an accelerator opening of the own vehicle, and a brake sensor configured to detect the amount of brake operation by the driver.

The positioning device 13 includes a global navigation satellite system (GNSS) receiver and receives radio waves from a plurality of navigation satellites and thereby measures a current position of the own vehicle 1. The GNSS receiver may be, for example, a global positioning system (GPS) receiver. The positioning device 13 may be, for example, an inertial navigation device.

The map database 14 may store high-precision map data (hereinafter, simply referred to as "high-precision map") that are suitable as map information for self-driving. The high-precision map is map data of higher precision than map data for navigation (hereinafter, simply referred to as "navigation map") and includes lane-by-lane information, which is more detailed than road-by-road information. Hereinafter, lane-by-lane information included in the high-precision map data is referred to as "lane information".

For example, the high-precision map includes, as lane information, information of lane nodes that indicate reference points on a lane reference line (for example, a central line in a lane) and information of lane links that indicate forms of lane sections between lane nodes.

Information of each lane node includes an identification number and position coordinates of the lane node, the number of connected lane links, and identification numbers of connected lane links. Information of each lane link includes an identification number of the lane link, a type of the lane, width of the lane, types of lane boundary lines, a shape of the lane, a gradient of the lane, a shape of a lane marking, and a shape of a lane reference line.

The high-precision map further includes types and position coordinates of ground objects, such as a stop line, a road sign, a building, a utility pole, a curb, and a crosswalk, that exist on a lane or in the vicinity of the lane and information of the ground objects, such as identification numbers of lane nodes and identification numbers of lane links that correspond to the position coordinates of the ground objects.

The high-precision map further includes information of a traffic light that exists on a lane or in the vicinity of the lane. Information of traffic lights included in the high-precision map data is sometimes referred to as "traffic light information".

The traffic light information includes information of an installation position of each traffic light and identification information of a stop line corresponding to each traffic light. The traffic light information specifies a lane on which traffic is controlled by the traffic light, via the identification information of the stop line corresponding to the traffic light.

When there exists no stop line corresponding to a traffic light, the traffic light information may include, for example, information of a lane node of an intersection at which the traffic light is installed or information of a crosswalk at which the traffic light is installed. The traffic light information specifies a lane on which traffic is controlled by the traffic light, via such information.

As used herein, a "lane on which traffic is controlled by a traffic light" is a lane on which traveling beyond a stop line installed corresponding to the traffic light is allowed or prohibited depending on indication of the traffic light or a lane on which entering an intersection or a crosswalk at which the traffic light is installed is allowed or prohibited depending on indication of the traffic light.

The information of the installation position of a traffic light includes at least two-dimensional coordinates in the map coordinate system (or a global coordinate system) of a position at which the traffic light is installed. The information of the installation position of a traffic light may include, in addition to the two-dimensional coordinates of the position at which the traffic light is installed, height information of the traffic light. However, since the installation height of traffic lights is prescribed to a value within a predetermined range by a law, the height of a traffic light does not necessarily have to be included in the high-precision map data.

The communication device 15 performs wireless communication with a communication device external to the own vehicle 1. A communication method used by the communication device 15 may be, for example, wireless communication through a public mobile telephone network, vehicle-to-vehicle communication, road-to-vehicle communication, or satellite communication.

The navigation system 17 recognizes a current position of the own vehicle 1, using the positioning device 13 and acquires map information at the current position from the map database 14. The navigation system 17 sets a travel route to a destination that a passenger inputs and performs route guidance for the passenger in accordance with the travel route. The navigation system 17 also outputs information on the set travel route to the controller 18. When performing autonomous travel control, the controller 18 causes the own vehicle 1 to self-drive in such a way that the own vehicle 1 travels along the travel route set by the navigation system 17.

The controller 18 is an electronic control unit (ECU) that performs vehicle control of the own vehicle 1. The controller 18 includes a processor 21 and peripheral components, such as a storage device 22. The processor 21 may be, for example, a central processing unit (CPU) or a micro-processing unit (MPU).

The storage device 22 may include a semiconductor storage device, a magnetic storage device, an optical storage device, and the like. The storage device 22 may include registers, a cache memory, a memory, such as a read only memory (ROM) or a random access memory (RAM), that is used as a main storage device, or the like.

Functions of the controller 18, which will be described below, may be achieved by, for example, the processor 21 executing computer programs stored in the storage device 22. Note that the controller 18 may be formed using dedicated hardware for performing information processing that will be described below. For example, the controller 18 may include a functional logic circuit that is implemented in a general-purpose semiconductor integrated circuit. For example, the controller 18 may include a programmable logic device (PLD), such as a field-programmable gate array (FPGA), and the like.

The actuators 19 operate the steering wheel, the accelerator opening, and a braking device of the own vehicle 1 according to a control signal from the controller 18 and thereby generates vehicle behavior of the own vehicle 1. The actuators 19 include a steering actuator, an accelerator opening actuator, and a brake control actuator. The steering actuator controls steering direction and the amount of steering in the steering of the own vehicle 1. The accelerator opening actuator controls the accelerator opening of the own vehicle 1. The brake control actuator controls braking action of the braking device of the own vehicle 1.

Next, an example of the travel control of the own vehicle 1 performed by the controller 18 will be described. The controller 18 recognizes a traffic light that controls traffic on a lane on which the own vehicle 1 travels, from a captured image captured by the camera 20. The controller 18 causes the own vehicle 1 to travel or stop in accordance with indication of the recognized traffic light.

As described above, when the range of the angle of view of the camera 20 is shielded by a preceding vehicle traveling in front of the own vehicle 1, it sometimes becomes impossible to recognize a traffic light from a captured image.

On the other hand, when the own vehicle is controlled in such a way as to constantly maintain sufficient inter-vehicle distance between the own vehicle 1 and the preceding vehicle in order to prevent the traffic light from being shielded from the range of the angle of view, there is a possibility that the inter-vehicle distance becomes needlessly long, which gives a sense of discomfort to a passenger of the own vehicle 1.

Thus, the controller 18 calculates a range of the angle of view (image capturing range) of the camera 20, based on optical information of the camera 20 (such as information of the angle of view of the camera 20) and installation information of the camera 20 (such as a mounting position of the camera on the own vehicle 1 and an orientation of the optical system of the camera). The optical information and the installation information of the camera 20 are set and stored in the storage device 22 in advance. Note that, when the installation information of the camera 20 (the mounting position of the camera and the orientation of the optical system with respect to the own vehicle 1) does not change, that is, when an installation state of the camera with respect to the own vehicle 1 is fixed, the installation information of the camera 20 is not necessarily needed because the range of the angle of view of the camera 20 with respect to the own vehicle is fixed.

The controller 18 calculates an imaging-enabled area in which an image of a traffic light can be captured on the lane by the camera 20 in a case where there exists no preceding vehicle, based on the range of the angle of view of the camera 20 and the map information.

Figure 2:
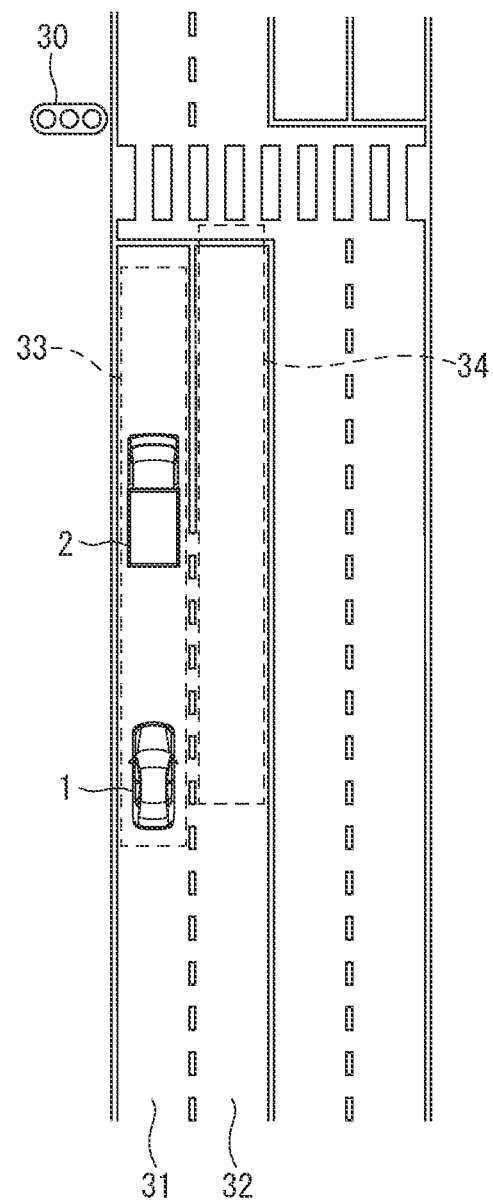
FIG. 2 is an explanatory diagram of an example of a method for controlling a vehicle of the embodiment.

FIG. 2 is now referred to. A case is now assumed where a traffic light 30 exists in front of the own vehicle 1. The traffic light 30 is a traffic light that controls traffic on a plurality of lanes 31 and 32. Traveling directions of the lanes 31 and 32 are the same, and the lane 31 is the travel lane of the own vehicle 1 and the lane 32 is an adjacent lane of the lane 31.

The controller 18 calculates an imaging-enabled area 33 in which an image of the traffic light 30 can be captured on the lane 31 by the camera 20 in a case where there exists no other vehicle on the road, based on traffic light information of the traffic light 30, lane information of the lane 31, and the range of the angle of view of the camera 20.

The imaging-enabled area 33 is an area in which an image of the traffic light 30 can be expected to be captured on the lane 31 by the camera 20 unless the range of the angle of view of the camera 20 is shielded by a preceding vehicle 2. Conversely, an area on the lane 31 outside the imaging-enabled area 33 is an area in which an image of the traffic light 30 cannot be captured even when the range of the angle of view of the camera 20 is not shielded.

Likewise, the controller 18 also calculates an imaging-enabled area 34 with respect to the lane 32. That is, the controller 18 calculates an imaging-enabled area 34 in which an image of the traffic light 30 can be captured on the lane 32 by the camera 20 in a case where there exists no other vehicle on the road, based on the traffic light information of the traffic light 30, lane information of the lane 32, and the range of the angle of view of the camera 20.

The controller 18 determines whether or not the own vehicle 1 is positioned in the imaging-enabled area 33 or 34. When the own vehicle 1 is positioned in the imaging-enabled area 33 or 34, an image of the traffic light 30 can be expected to be captured unless the range of the angle of view of the camera 20 is shielded by a preceding vehicle. Therefore, in this case, the controller 18 controls the own vehicle 1 in such a way that the traffic light 30 is not shielded from the range of the angle of view of the camera 20 by the preceding vehicle 2.

For example, when the traffic light 30 is not recognized from a captured image captured by the camera 20, the controller 18 calculates an inter-vehicle distance at which the traffic light 30 is not shielded by the preceding vehicle 2 and, by decelerating the own vehicle 1 according to the inter-vehicle distance, increases an inter-vehicle distance between the preceding vehicle 2 and the own vehicle 1.

In addition to or in place of the above, the controller 18 may steer the own vehicle in such a way as to increase lateral positional deviation between the own vehicle 1 and the preceding vehicle 2 in a direction in which the traffic light 30 is deviated away from the center of the lane 31.

On the other hand, when the traffic light 30 is recognized from a captured image captured by the camera 20, the controller 18 controls speed of the own vehicle 1 in such a way as to maintain the inter-vehicle distance between the preceding vehicle 2 and the own vehicle 1 at an inter-vehicle distance at which the traffic light 30 is not shielded by the preceding vehicle 2.

The travel control of the own vehicle 1 to avoid the traffic light 30 from being shielded from the range of the angle of view of the camera 20 by the preceding vehicle 2 as described above is hereinafter referred to as "shielding avoidance control".

On the contrary, when the own vehicle 1 is positioned in neither the imaging-enabled area 33 nor 34, an image of the traffic light 30 cannot be captured originally even when the range of the angle of view of the camera 20 is not shielded. Therefore, in this case, the above-described shielding avoidance control is suppressed.

This configuration enables the shielding avoidance control to be prevented from being unnecessarily executed in an area in which an image of the traffic light 30 cannot be captured originally. As a result, it is possible to suppress a sense of discomfort from being given to the passenger of the own vehicle 1 by unnecessary execution of the shielding avoidance control.

For example, in the autonomous travel control and the constant speed travel control described above, the controller 18 controls the inter-vehicle distance between the preceding vehicle 2 and the own vehicle 1 in such a way that the inter-vehicle distance coincides with a determined target value regardless of whether or not the traffic light 30 is shielded from the range of the angle of view of the camera 20 by the preceding vehicle 2. For example, the controller 18 may determine a target value of the inter-vehicle distance to a preceding vehicle according to speed of the own vehicle 1.

In addition, the controller 18 may control the lateral position of the own vehicle 1 in such a way that the lateral position of the own vehicle 1 in the lane 31, which is the travel lane of the own vehicle 1, coincides with a predetermined initial value (for example, the lane center).

Figure 3:
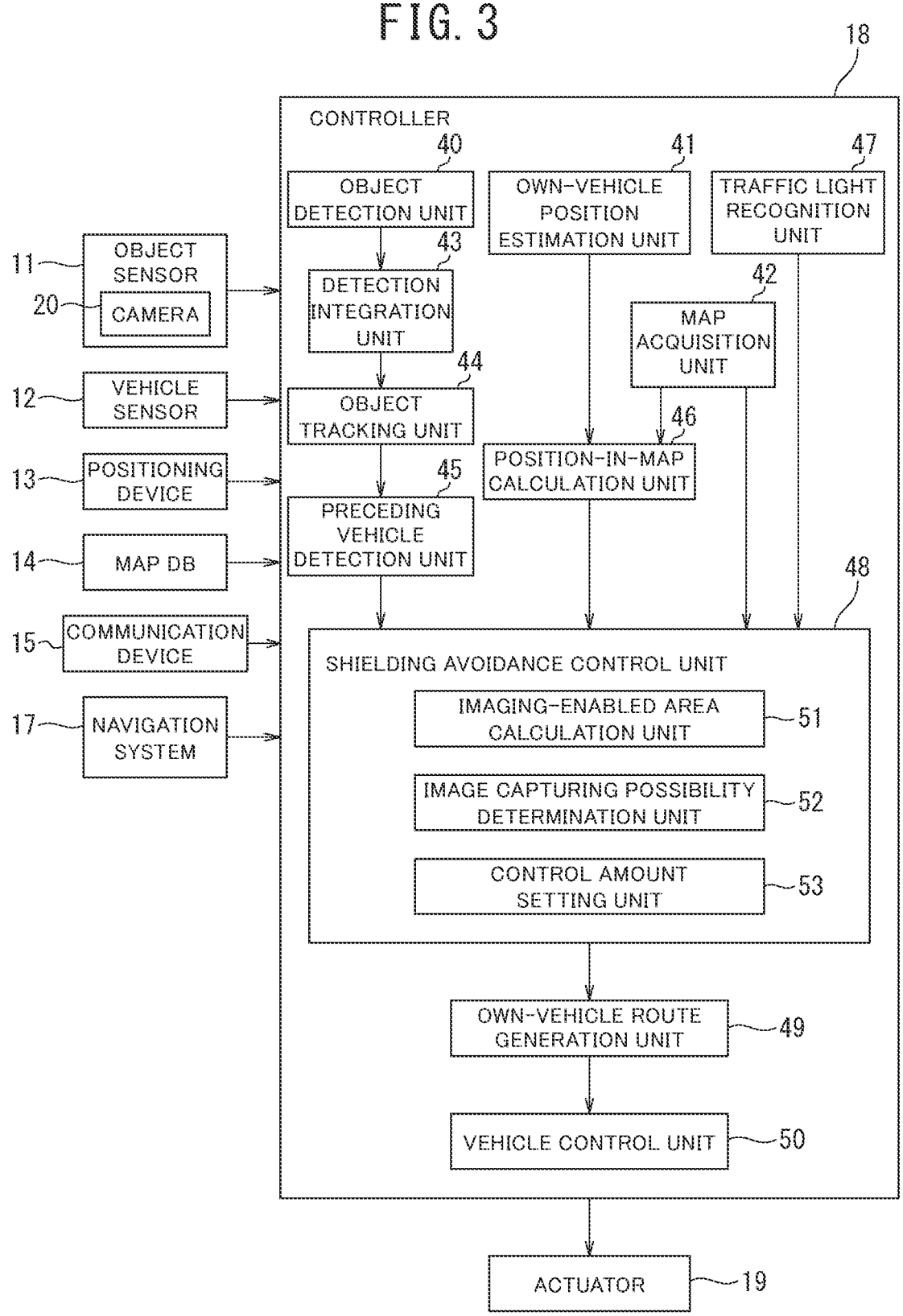
FIG. 3 is a block diagram illustrative of an example of a functional configuration of the vehicle control device of the embodiment.

Functions of the controller 18 will be described below in detail. FIG. 3 is now referred to. The controller 18 includes an object detection unit 40, an own-vehicle position estimation unit 41, a map acquisition unit 42, a detection integration unit 43, an object tracking unit 44, a preceding vehicle detection unit 45, a position-in-map calculation unit 46, a traffic light recognition unit 47, a shielding avoidance control unit 48, an own-vehicle route generation unit 49, and a vehicle control unit 50.

The object detection unit 40 detects a position, an attitude, a size, a speed, and the like of an object, such as a vehicle, a motorcycle, a pedestrian, and an obstacle, around the own vehicle 1, based on detection signals from the object sensors 11. The object detection unit 40 outputs a detection result representing a two-dimensional position, an attitude, a size, a speed, and the like of an object in, for example, a zenith view (also referred to as a plan view), which is a view of the own vehicle 1 viewed from the air.

The own-vehicle position estimation unit 41 measures an absolute position, that is, a position of the own vehicle 1 with respect to a predetermined reference point, an attitude, and a speed of the own vehicle 1, based on a measurement result by the positioning device 13 and odometry using detection results from the vehicle sensors 12.

The map acquisition unit 42 acquires map information of a road on which the own vehicle 1 travels from the map database 14. The map acquisition unit 42 may acquire map information from an external map data server through the communication device 15.

The map information acquired by the map acquisition unit 42 includes traffic light information of a traffic light existing in front of the own vehicle 1 on the path of the own vehicle 1, lane information of a lane on which traffic is controlled by the traffic light, and information of ground objects existing on the lane or in the vicinity thereof.

The detection integration unit 43 integrates a plurality of detection results that the object detection unit 40 has respectively acquired from a plurality of object detection sensors and outputs a single set of a two-dimensional position, an attitude, a size, a speed, and the like with respect to each object. Specifically, the detection integration unit 43 calculates, from behavior of each object acquired from the respective ones of the object detection sensors, the most reasonable behavior of the object that minimizes error in consideration of error characteristics and the like of the respective object detection sensors.

Specifically, the detection integration unit 43 comprehensively evaluates detection results acquired from a plurality of types of sensors by using a known sensor fusion technology and thereby acquires a more accurate detection result.

The object tracking unit 44 tracks an object detected by the object detection unit 40. Specifically, the object tracking unit 44 performs verification of identity (association) among objects detected at different time points from behaviors of an object output at different time points, based on detection results integrated by the detection integration unit 43 and, based on the association, predicts behavior of the object, such as speed of the object.

The preceding vehicle detection unit 45 detects a preceding vehicle in front of the own vehicle 1 out of objects that exist around the own vehicle 1 and that are detected by the detection integration unit 43 and the object tracking unit 44 and outputs a detection result to the shielding avoidance control unit 48.

The position-in-map calculation unit 46 estimates a position and an attitude of the own vehicle 1 on the map from the absolute position of the own vehicle 1, which is acquired by the own-vehicle position estimation unit 41, and the map information, which is acquired by the map acquisition unit 42.

In addition, the position-in-map calculation unit 46 identifies a road on which the own vehicle 1 is traveling and also a lane on which the own vehicle 1 travels within the identified road. The position-in-map calculation unit 46 outputs the position and attitude of the own vehicle 1 on the map and information of the lane on which the own vehicle 1 travels to the shielding avoidance control unit 48.

The traffic light recognition unit 47 analyzes a captured image captured by the camera 20 and recognizes a traffic light and a lighting color thereof. The traffic light recognition unit 47 outputs a recognition result of a traffic light to the shielding avoidance control unit 48.

The shielding avoidance control unit 48 executes the shielding avoidance control to avoid a traffic light in front of the own vehicle 1 from being shielded from the range of the angle of view of the camera 20 by a preceding vehicle, based on the map information acquired by the map acquisition unit 42, a detection result detected by the preceding vehicle detection unit 45, a position of the own vehicle 1 identified by the position-in-map calculation unit 46, and a recognition result by the traffic light recognition unit 47.

The shielding avoidance control unit 48 includes an imaging-enabled area calculation unit 51, an image capturing possibility determination unit 52, and a control amount setting unit 53.

The imaging-enabled area calculation unit 51 calculates an imaging-enabled area in which an image of a traffic light in front of the own vehicle 1 can be captured from a position on the lane controlled by the traffic light, using the camera 20, based on the optical information and the installation information of the camera 20 and the map information.

Figure 4:
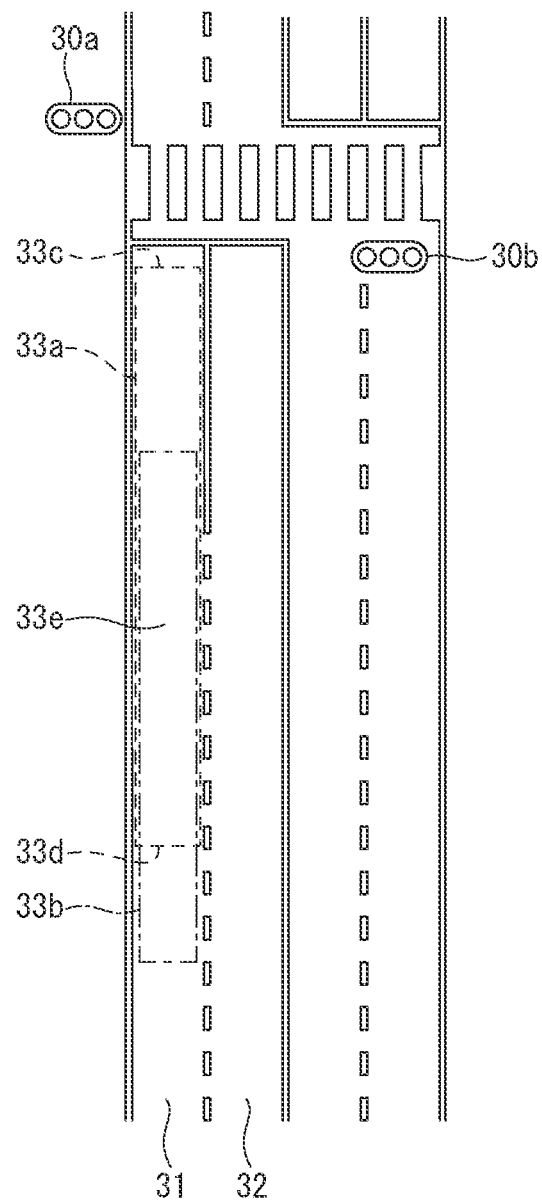
FIG. 4 is an explanatory diagram of an example of imaging-enabled areas.

FIG. 4 is now referred to. A case is now assumed where traffic lights 30a and 30b exist in front of the own vehicle 1. The traffic lights 30a and 30b are traffic lights that control traffic on a plurality of lanes 31 and 32. The lanes 31 and 32 are lanes the traveling directions of which are the same and that are adjacent to each other.

The imaging-enabled area calculation unit 51 calculates an imaging-enabled area with respect to each of the plurality of lanes 31 and 32. First, calculation of an imaging-enabled area on the lane 31 will be described.

First, the imaging-enabled area calculation unit 51 calculates an imaging-enabled area 33a in which an image of the traffic light 30a among the plurality of traffic lights 30a and 30b can be captured.

The imaging-enabled area calculation unit 51 calculates the imaging-enabled area 33a, based on information of an installation position and height of the traffic light 30a, a road structure and a gradient of the lane 31, and the optical information and the installation information of the camera 20.

For example, the imaging-enabled area calculation unit 51 may calculate the imaging-enabled area 33a by searching for a point on the lane 31 at which an image of the traffic light 30a can be captured.

On this occasion, the imaging-enabled area calculation unit 51 may determine that the camera 20 can capture an image of the traffic light 30a when the traffic light 30a is positioned within both a vertical range of the angle of view and a horizontal range of the angle of view of the camera 20 and determine that the camera 20 cannot capture an image of the traffic light 30a when the traffic light 30a is positioned out of either the vertical range of the angle of view or the horizontal range of the angle of view.

Figure 5A:
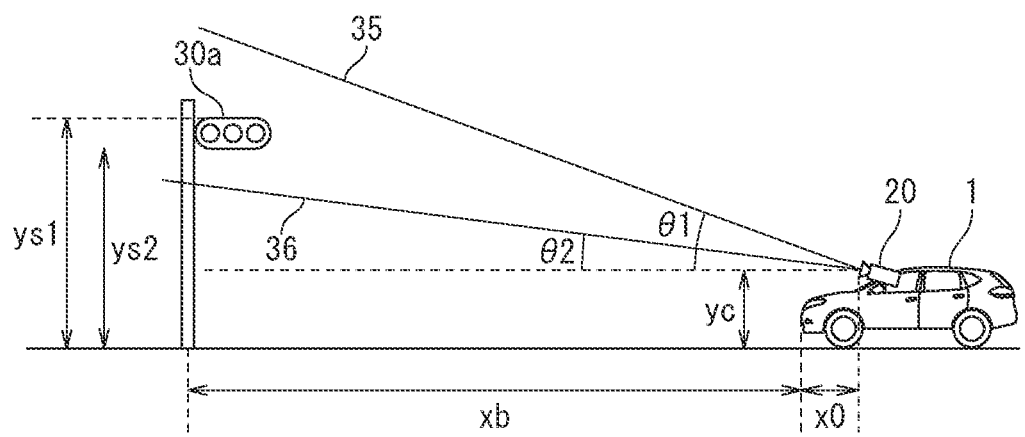
FIG. 5A is an explanatory diagram of an example of a calculation method of the imaging-enabled areas.

FIG. 5A is now referred to. The imaging-enabled area calculation unit 51 determines that the traffic light 30a is positioned within the vertical range of the angle of view of the camera 20 when, for example, the formulae (1) and (2) below are satisfied.

$$(xb+x0)\tan \theta 1 > ys1 - yc \quad (1)$$

$$(xb+x0)\tan \theta 2 < ys2 - yc \quad (2)$$

In the above formulae, xb is horizontal distance from the own vehicle 1 to the traffic light 30a, x0 is longitudinal distance from the front edge of the own vehicle 1 to the mounting position of the camera 20, yc is height of the mounting position of the camera 20, ys1 is height of the top edge of the traffic light 30a, and ys2 is height of the lower edge of the traffic light 30a.

θ1 is an elevation angle of an upper limit 35 of the range of the angle of view of the camera 20, and θ2 is an elevation angle of a lower limit 36 of the range of the angle of view of the camera 20.

Note that, when no height information of the traffic light 30a is included in the map information, a value that can be assumed to be a height of a general traffic light, based on an installation standard stipulated by an administrative organ or the like may be used as the height of the traffic light 30a. For example, ys1 and ys2 may be assumed to be 5.7 m and 4.7 m, respectively.

Note that, in this example, when the camera 20 is fixed with respect to the own vehicle 1, the longitudinal distance (x0) from the front edge of the own vehicle 1 to the mounting position of the camera 20, the height (yc) of the mounting position of the camera 20, the elevation angle (θ1) of the upper limit 35 of the range of the angle of view of the camera 20, and the elevation angle (θ2) of the lower limit 36 of the range of the angle of view of the camera 20 do not change. That is, since, when the camera 20 is fixed with respect to the own vehicle 1, the vertical range of the angle of view of the camera 20 with respect to the own vehicle 1 does not change, storing the vertical range of the angle of view of the camera 20 with respect to the own vehicle 1 in advance and detecting only the horizontal distance (xb) from the own vehicle 1 to the traffic light 30a enable the imaging-enabled area calculation unit 51 to determine that the traffic light 30a is positioned within the vertical range of the angle of view of the camera 20. However, when the camera 20 is not fixed, but movable with respect to the own vehicle 1 or change in the range of the angle of view due to pitching motion of the own vehicle 1 is taken into account, the imaging-enabled area calculation unit 51 may detect the longitudinal distance (x0) from the front edge of the own vehicle 1 to the mounting position of the camera 20, the height (yc) of the mounting position of the camera 20, the elevation angle (θ1) of the upper limit 35 of the range of the angle of view of the camera 20, and the elevation angle (θ2) of the lower limit 36 of the range of the angle of view of the camera 20 and, using the above-described formulae (1) and (2), determine whether or not the traffic light 30a is positioned within the vertical range of the angle of view of the camera 20.

Figure 5B:
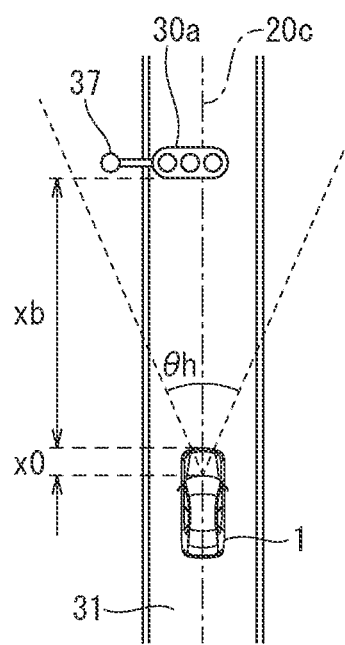
FIG. 5B is another explanatory diagram of the example of the calculation method of the imaging-enabled areas.

FIG. 5B is now referred to. The imaging-enabled area calculation unit 51 determines whether or not the traffic light 30a is positioned within the horizontal range of the angle of view of the camera 20, based on deviation in the lateral direction of the traffic light 30a with respect to an optical center 20c of the camera 20, horizontal distance (xb+x0) from the camera 20 to the traffic light 30a, and a horizontal angle of view θh of the camera 20.

On this occasion, it may be assumed that the own vehicle 1 is positioned at the center of the lane 31. When installation position information of the traffic light 30a included in the map information is two-dimensional coordinates of a pillar 37 of the traffic light 30a, the coordinates of the pillar 37 may be used as the coordinates of the traffic light 30a.

FIG. 4 is now referred to. Hereinafter, a point nearest to a traffic light within an imaging-enabled area is referred to as "near end", and a point furthest from the traffic light within the imaging-enabled area is referred to as "far end". The near end of the imaging-enabled area 33a is denoted by a reference sign 33c, and the far end of the imaging-enabled area 33a is denoted by a reference sign 33d.

An upper limit of distance between the far end 33d of the imaging-enabled area 33a and the traffic light 30a may be determined with performance of the optical system of the camera 20 considered. For example, the far end 33d may be set according to the minimum number of pixels required to recognize the traffic light 30a on a captured image. Alternatively, the far end 33d may be set in such a way that distance from the traffic light 30a to the far end 33d is equal to or less than a threshold value.

The imaging-enabled area calculation unit 51 also calculates, with respect to the traffic light 30b, an imaging-enabled area 33b in which an image of the traffic light 30b can be captured on the lane 31, in a similar manner.

As described above, the imaging-enabled area calculation unit 51 calculates the imaging-enabled areas 33a and 33b in which images of the traffic lights 30a and 30b can be captured on the lane 31 with respect to all the traffic lights 30a and 30b controlling traffic on the lane 31, respectively.

The imaging-enabled area calculation unit 51 calculates a union area of the imaging-enabled areas 33a and 33b (that is, an area in which any point therein is included at least either of the imaging-enabled areas 33a and 33b) as an imaging-enabled area in which an image of at least one of the traffic lights 30a and 30b, which control traffic on the lane 31, can be captured on the lane 31.

The imaging-enabled area calculation unit 51 also calculates an overlapping area 33e of the imaging-enabled areas 33a and 33b.

Figure 6:
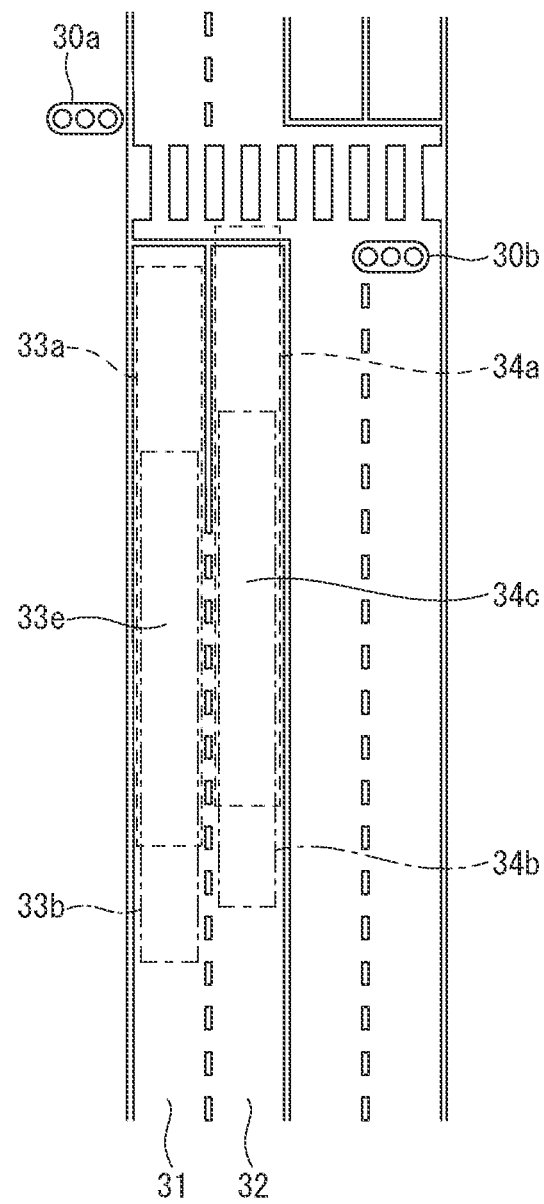
FIG. 6 is an explanatory diagram of an example of imaging-enabled areas on a plurality of lanes.

FIG. 6 is now referred to. Next, the imaging-enabled area calculation unit 51 calculates an imaging-enabled area on the lane 32 that is adjacent to the lane 31.

As with the case of the lane 31, the imaging-enabled area calculation unit 51 calculates an imaging-enabled area 34a in which an image of the traffic light 30a can be captured on the lane 32 and an imaging-enabled area 34b in which an image of the traffic light 30b can be captured on the lane 32.

The imaging-enabled area calculation unit 51 calculates a union area of the imaging-enabled areas 34a and 34b as an imaging-enabled area in which an image of at least one of the traffic lights 30a and 30b, which control traffic on the lane 32, can be captured on the lane 32.

The imaging-enabled area calculation unit 51 also calculates an overlapping area 34c of the imaging-enabled areas 34a and 34b.

FIG. 3 is now referred to. The image capturing possibility determination unit 52 determines whether or not the own vehicle 1 is positioned in the imaging-enabled areas calculated by the imaging-enabled area calculation unit 51 (for example, whether or not the own vehicle 1 is traveling in the imaging-enabled areas).

In the example in FIGS. 4 and 6, the image capturing possibility determination unit 52 determines whether or not the own vehicle 1 is positioned in either the union area of the imaging-enabled areas 33a and 33b or the union area of the imaging-enabled areas 34a and 34b. That is, the image capturing possibility determination unit 52 determines whether or not the own vehicle 1 is positioned in any of the imaging-enabled areas 33a, 33b, 34a, and 34b.

When the image capturing possibility determination unit 52 determines that the own vehicle 1 is positioned in an imaging-enabled area, the control amount setting unit 53 sets a target control amount in the travel control of the own vehicle 1 for the shielding avoidance control depending on a recognition state of traffic lights recognized by the traffic light recognition unit 47 and a detection result of a preceding vehicle detected by the preceding vehicle detection unit 45.

The control amount setting unit 53 sets, as a target control amount, for example, a target inter-vehicle distance between the own vehicle 1 and a preceding vehicle or a target lateral position of the own vehicle 1 in the travel lane.

Figure 7:
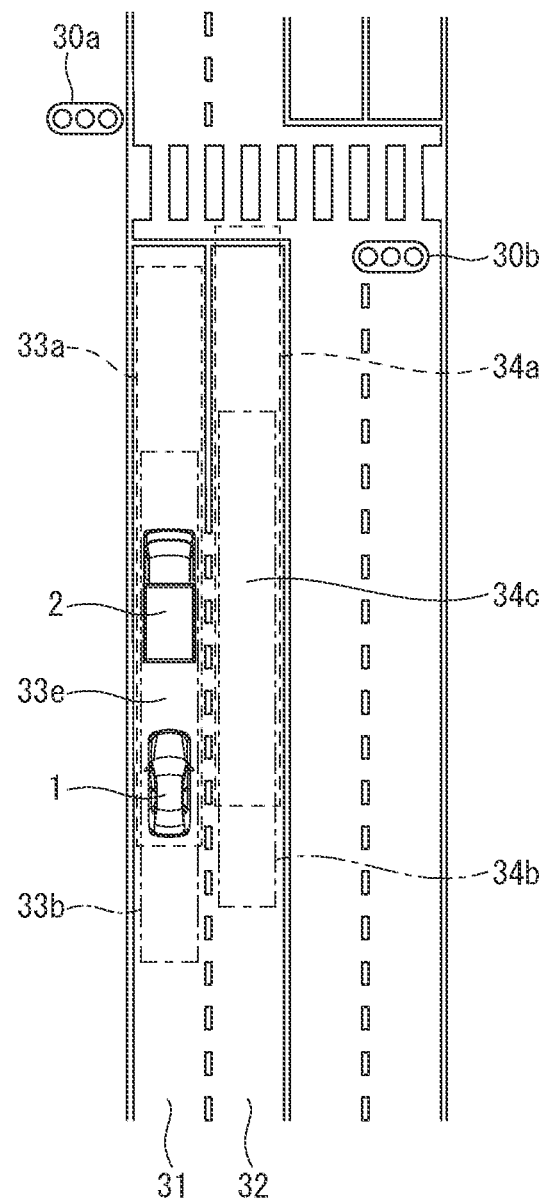
FIG. 7 is an explanatory diagram of an example of vehicle control when an own vehicle is positioned in an imaging-enabled area.

FIG. 7 is now referred to. A case is now assumed where the image capturing possibility determination unit 52 has determined that the own vehicle 1 is positioned in an imaging-enabled area and the preceding vehicle detection unit 45 has detected a preceding vehicle 2.

The control amount setting unit 53 determines whether or not the traffic light recognition unit 47 recognizes the traffic light 30a or 30b. When the control amount setting unit 53 determines that the traffic light recognition unit 47 recognizes the traffic light 30a or 30b, the control amount setting unit 53 determines that the current inter-vehicle distance is an inter-vehicle distance at which at least one of the traffic lights 30a and 30b is not shielded from the range of the angle of view of the camera 20 by the preceding vehicle 2 and sets the current inter-vehicle distance as a target inter-vehicle distance.

When the control amount setting unit 53 determines that the traffic light recognition unit 47 recognizes neither the traffic light 30a nor 30b, the control amount setting unit 53 sets a target control amount in such a way that at least one of the traffic lights 30a and 30b is prevented from being shielded from the range of the angle of view of the camera 20 by the preceding vehicle 2.

For example, when it is determined that the own vehicle 1 is positioned in the imaging-enabled area 33a, the control amount setting unit 53 calculates an inter-vehicle distance at which the traffic light 30a is not shielded by the preceding vehicle 2 and sets the calculated inter-vehicle distance as a target inter-vehicle distance. That is, when a preceding vehicle 2 exists and the traffic light recognition unit 47 does not recognize neither the traffic light 30a nor the traffic light 30b despite the own vehicle 1 being positioned in an imaging-enabled area, the control amount setting unit 53 determines that the inter-vehicle distance between the preceding vehicle 2 and the own vehicle 1 is small and the traffic light 30a is shielded by the preceding vehicle 2, and increases the inter-vehicle distance between the preceding vehicle 2 and the own vehicle 1 to an inter-vehicle distance at which the traffic light 30a is not shielded by the preceding vehicle 2.

Figure 8:
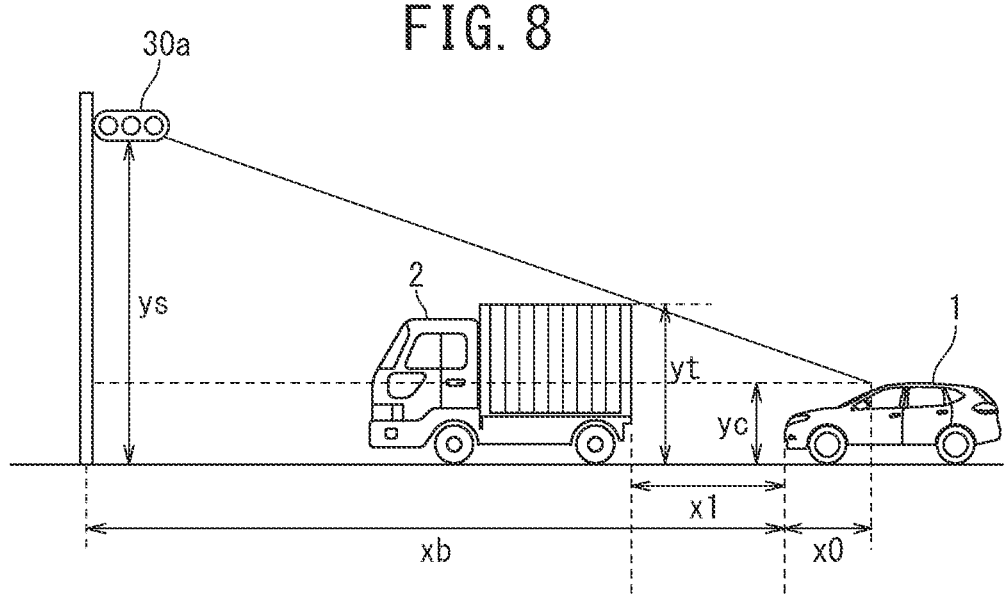
FIG. 8 is an example of a calculation method of inter-vehicle distance.

FIG. 8 is now referred to. For example, the control amount setting unit 53 calculates an inter-vehicle distance $x1$ at which the traffic light 30a is not shielded by the preceding vehicle 2, using the formula (3) below.

$$x1=(xb+x0)\times(yt-yc)/(ys-yc)-x0 \quad (3)$$

In this formula, yt denotes height of the preceding vehicle 2, and ys denotes height of the traffic light 30a.

Likewise, when it is determined that the own vehicle 1 is positioned in the imaging-enabled area 33b, the control amount setting unit 53 calculates an inter-vehicle distance at which the traffic light 30b is not shielded by the preceding vehicle 2, and sets the calculated inter-vehicle distance as a target inter-vehicle distance.

When it is determined that the own vehicle 1 is positioned in the overlapping area 33e of the imaging-enabled areas 33a and 33b, the control amount setting unit 53 calculates either an inter-vehicle distance at which the traffic light 30a is not shielded by the preceding vehicle 2 or an inter-vehicle distance at which the traffic light 30b is not shielded by the preceding vehicle 2, and sets the calculated inter-vehicle distance as a target inter-vehicle distance.

The control amount setting unit 53 may calculate both an inter-vehicle distance at which the traffic light 30a is not shielded by the preceding vehicle 2 and an inter-vehicle distance at which the traffic light 30b is not shielded by the preceding vehicle 2, and set an inter-vehicle distance smaller than the other among the calculated inter-vehicle distances as a target inter-vehicle distance or set an inter-vehicle distance larger than the other thereamong as a target inter-vehicle distance.

Figure 9:
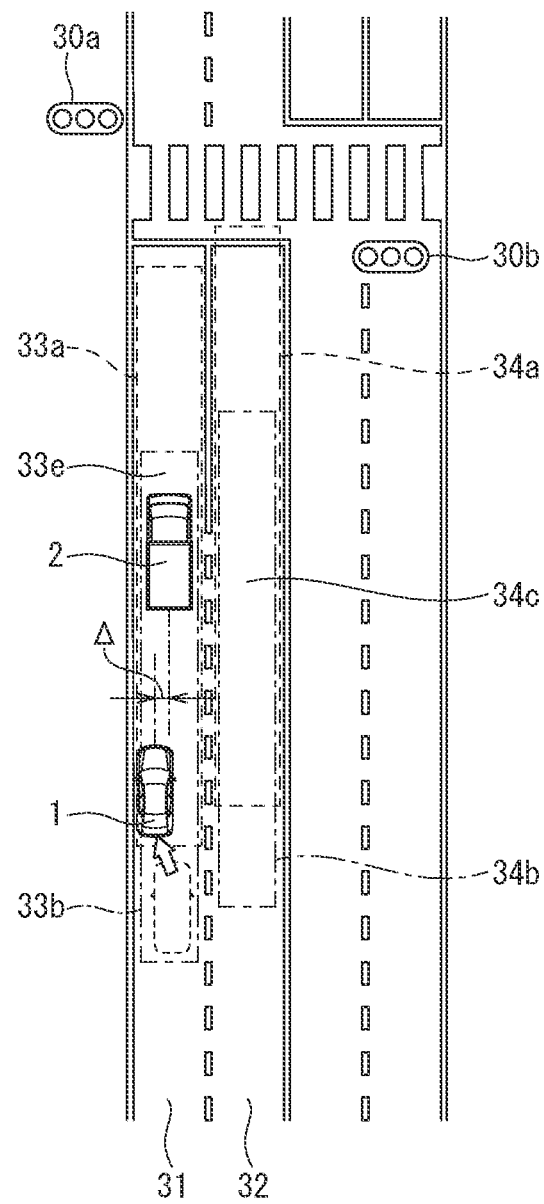
FIG. 9 is an explanatory diagram of another example of the vehicle control when the own vehicle is positioned in an imaging-enabled area.

FIG. 9 is now referred to. The control amount setting unit 53 may set a target lateral position of the own vehicle 1 in the travel lane 31. That is, the control amount setting unit 53 may set a lateral position in the travel lane 31 that causes lateral positional deviation between the own vehicle 1 and the preceding vehicle 2 to increase, as a target lateral position.

For example, when it is determined that the own vehicle 1 is positioned in the imaging-enabled area 33a, the control amount setting unit 53 determines whether or not the traffic light 30a is deviated away from the center of the lane 31.

When the traffic light 30a is deviated away from the center of the lane 31 (that is, when the position in the vehicle width direction of the traffic light 30a is deviated from the center of the lane 31), the control amount setting unit 53 sets a target lateral position in such a way that lateral position deviation Δ between the own vehicle 1 and the preceding vehicle 2 increases in the direction in which the traffic light 30a is deviated away from the center of the lane 31.

Since the traffic light 30a is deviated away from the center of the lane 31 in the leftward direction, the control amount setting unit 53 sets a target lateral position in such a way that the deviation Δ increases in the leftward direction.

Likewise, when it is determined that the own vehicle 1 is positioned in the imaging-enabled area 33b, the control amount setting unit 53 determines whether or not the traffic light 30b is deviated away from the center of the lane 31.

When the traffic light 30b is deviated away from the center of the lane 31, the control amount setting unit 53 sets a target lateral position in such a way that the lateral positional deviation Δ between the own vehicle 1 and the preceding vehicle 2 increases in the direction in which the traffic light 30b is deviated away from the center of the lane 31.

Since the traffic light 30b is deviated away from the center of the lane 31 in the rightward direction, the control amount setting unit 53 sets a target lateral position in such a way that the deviation Δ increases in the rightward direction.

When it is determined that the own vehicle 1 is positioned in the overlapping area 33e of the imaging-enabled areas 33a and 33b, the control amount setting unit 53 may set a target lateral position in such a way that the deviation Δ increases in the leftward direction or may set a target lateral position in such a way that the deviation Δ increases in the rightward direction.

Figure 10:
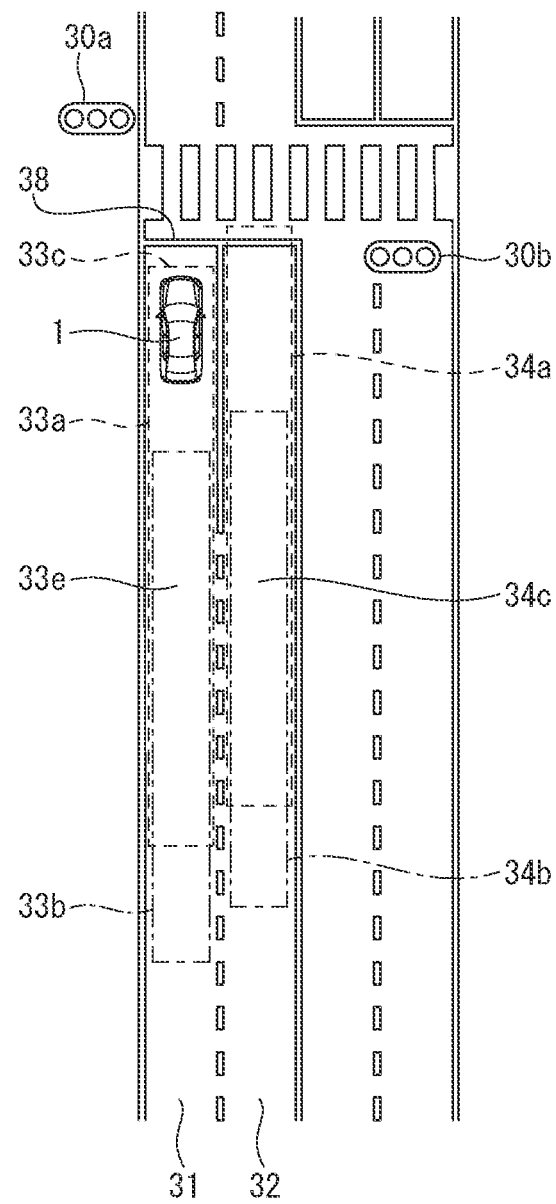
FIG. 10 is an explanatory diagram of an example of vehicle control when no preceding vehicle exists and no traffic light can be recognized.

FIG. 10 is now referred to. A case is now assumed where the image capturing possibility determination unit 52 has determined that the own vehicle 1 is positioned in an imaging-enabled area and the preceding vehicle detection unit 45 has not detected a preceding vehicle 2.

Even in such a case, the traffic light recognition unit 47 sometimes cannot recognize the traffic light 30a or 30b depending on a photographing condition, such as the direction of sunlight, and a device state of the camera 20. Thus, the control amount setting unit 53 determines whether or not the traffic light recognition unit 47 recognizes the traffic light 30a or 30b.

When the control amount setting unit 53 determines that the traffic light recognition unit 47 does not recognize the traffic light 30a or 30b, the own vehicle 1 cannot travel further forward than a stop line 38 corresponding to the traffic light 30a or 30b because the lighting color of the traffic light 30a or 30b is unclear. When the own vehicle 1 comes close to the traffic light 30a beyond the near end 33c of the imaging-enabled area 33a, the camera 20 cannot capture an image of the traffic light 30a or 30b even when the photographing condition and the device state get better.

Thus, the control amount setting unit 53 sets a position that is further from the traffic light 30a than the other among the stop line 38 and the near end 33c of the imaging-enabled area 33a as a target stop position.

Figure 11:
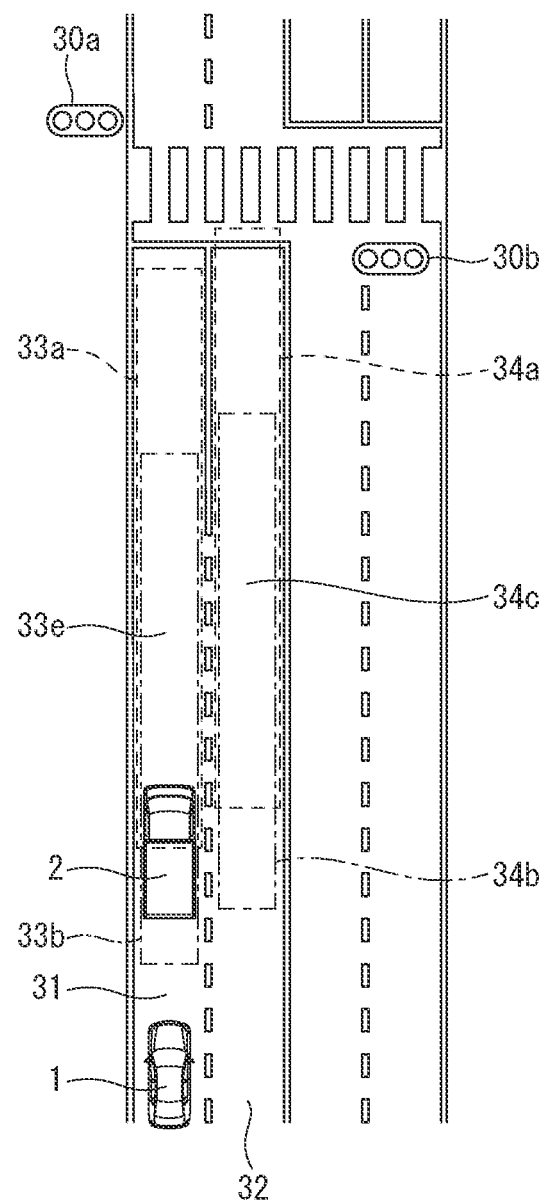
FIG. 11 is a diagram illustrative of a situation in which the own vehicle is positioned outside imaging-enabled areas.

FIG. 11 is now referred to. When it is determined that the own vehicle 1 is not positioned in any imaging-enabled area, the control amount setting unit 53 suppresses the above-described shielding avoidance control.

For example, even when the control amount setting unit 53 determines that the traffic light recognition unit 47 recognizes neither the traffic light 30a nor the traffic light 30b, the control amount setting unit 53 does not change a determined target inter-vehicle distance and target lateral position in autonomous travel control or constant speed travel control, regardless of whether or not the traffic light 30a or 30b is shielded from the range of the angle of view of the camera 20 by a preceding vehicle 2.

Although a case where the own vehicle 1 travels on the lane 31 was described above, a target control amount for the shielding avoidance control can similarly be set using the imaging-enabled areas 34a and 34b and the overlapping area 34c with respect to a case where the own vehicle 1 travels on the lane 32.

FIG. 3 is now referred to. The own-vehicle route generation unit 49 generates a target travel track and a speed profile of the own vehicle 1 in such a way that the own vehicle 1 travels along a travel lane of the own vehicle 1 without colliding with another vehicle in accordance with traffic rules, based on a result of detection, by the detection integration unit 43 and the object tracking unit 44, of an object around the own vehicle 1 and vehicle signals from the vehicle sensors 12.

On this occasion, the own-vehicle route generation unit 49 generates the speed profile in such a way that the inter-vehicle distance between the own vehicle 1 and a preceding vehicle coincides with a target inter-vehicle distance set by the shielding avoidance control unit 48.

Because of this configuration, when a traffic light is shielded from the range of the angle of view of the camera 20 by a preceding vehicle, a speed profile that causes the own vehicle 1 to decelerate in such a way that the inter-vehicle distance between the own vehicle 1 and the preceding vehicle increases to a value larger than the target inter-vehicle distance is generated.

When the traffic light is not shielded from the range of the angle of view of the camera 20 by a preceding vehicle, a speed profile that causes the own vehicle 1 to maintain the inter-vehicle distance between the own vehicle 1 and the preceding vehicle is generated.

The own-vehicle route generation unit 49 generates a target travel track that causes the own vehicle 1 to change the lateral position in a lane of the own vehicle 1 to a target lateral position set by the shielding avoidance control unit 48.

Because of this configuration, when a traffic light is shielded from the range of the angle of view of the camera 20 by a preceding vehicle, a target travel track that causes lateral positional deviation between the own vehicle 1 and the preceding vehicle to increase in a direction in which the traffic light is deviated away from the center of the travel lane of the own vehicle 1.

The own-vehicle route generation unit 49 generates a target travel track and a speed profile that causes the own vehicle to stop at a target stop position set by the shielding avoidance control unit 48.

The vehicle control unit 50 drives the actuators 19 in such a way that the own vehicle 1 travels on a target travel track at speed according to a speed profile that the own-vehicle route generation unit 49 has generated.

Because of this configuration, when, for example, the inter-vehicle distance between the own vehicle 1 and the preceding vehicle is larger than the target inter-vehicle distance set by the shielding avoidance control unit 48, the vehicle control unit 50 decelerates the own vehicle 1 by controlling the brake control actuator.

When the inter-vehicle distance between the own vehicle 1 and the preceding vehicle and the target inter-vehicle distance are equal to each other, the vehicle control unit 50 maintains the inter-vehicle distance to the preceding vehicle by controlling the accelerator opening actuator and the brake control actuator.

When the shielding avoidance control unit 48 sets a target lateral position, the vehicle control unit 50 steers the own vehicle 1 by controlling the steering actuator and causes the own vehicle 1 to change the lateral position thereof to the set target lateral position.

When the shielding avoidance control unit 48 sets a target stop position, the vehicle control unit 50 causes the own vehicle to stop at the set target stop position.

Subsequently, when the inter-vehicle distance between the own vehicle 1 and the preceding vehicle coincides with the target inter-vehicle distance set by the shielding avoidance control unit 48 due to deceleration of the own vehicle 1 controlled by the vehicle control unit 50, the control amount setting unit 53 determines whether or not the traffic light recognition unit 47 recognizes a traffic light.

When the control amount setting unit 53 determines that the traffic light recognition unit 47 does not recognize a traffic light even when the inter-vehicle distance between the own vehicle 1 and the preceding vehicle coincides with the target inter-vehicle distance, it is considered that the traffic light recognition unit 47 cannot recognize a traffic light because of a factor other than a preceding vehicle (for example, a photographing condition or a device state of the camera 20).

Thus, as with the case where the preceding vehicle 2 is not detected (FIG. 10), the control amount setting unit 53 sets a position that is further from the traffic light 30*a* than the other among the stop line 38 and the near end 33*c* of the imaging-enabled area 33*a* as a target stop position.

The same applies to a case where the traffic light recognition unit 47 cannot recognize the traffic light 30*a* or 30*b* even when, as a result of increase in the lateral positional deviation Δ between the own vehicle 1 and the preceding vehicle 2, the lateral position of the own vehicle 1 reaches a maximum allowable lateral position.

Operation

Figure 12:
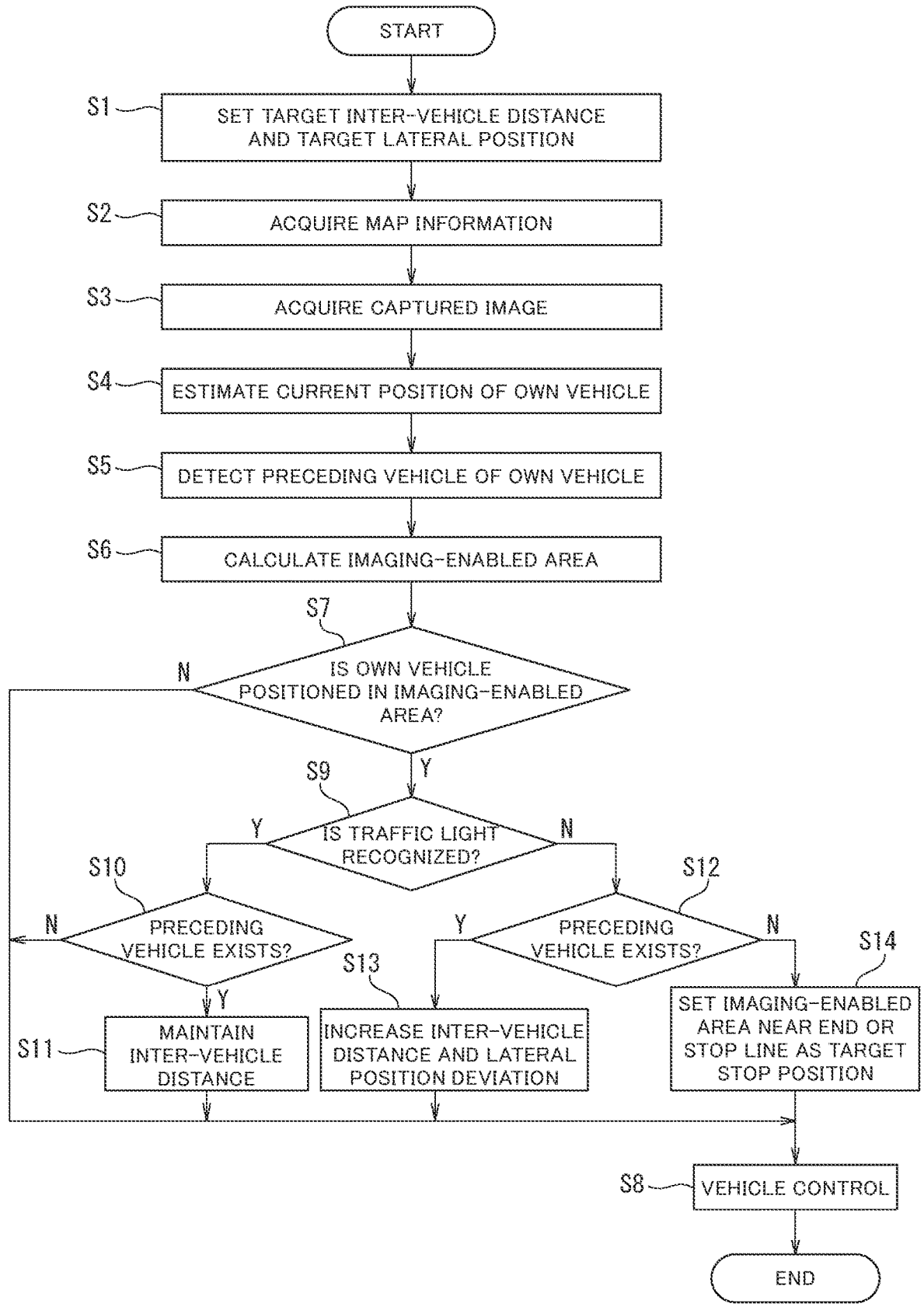
FIG. 12 is a flowchart of an example of the method for controlling the vehicle of the embodiment.

Next, an example of a method for controlling a vehicle of the present embodiment will be described with reference to FIG. 12.

In step S1, the controller 18 sets a target inter-vehicle distance and a target lateral position in autonomous travel control and constant speed travel control. For example, the controller 18 may set a target inter-vehicle distance according to speed of the own vehicle 1. In addition, for example, the controller 18 may set the center of a travel lane of the own vehicle 1 as a target lateral position.

In step S2, the map acquisition unit 42 acquires map information of a road on which the own vehicle 1 travels.

In step S3, the traffic light recognition unit 47 acquires a captured image captured by the camera 20. The traffic light recognition unit 47 analyzes the captured image captured by the camera 20 and recognizes a traffic light and a lighting color thereof.

In step S4, the own-vehicle position estimation unit 41 estimates a current position of the own vehicle 1.

In step S5, the preceding vehicle detection unit 45 detects a preceding vehicle in front of the own vehicle 1.

In step S6, the imaging-enabled area calculation unit 51 calculates an imaging-enabled area in which an image of the traffic light can be captured on the lane by the camera 20.

In step S7, the image capturing possibility determination unit 52 determines whether or not the own vehicle 1 is positioned in the imaging-enabled area. When the image capturing possibility determination unit 52 determines that the own vehicle 1 is not positioned in the imaging-enabled area (step S7: N), the process proceeds to step S8.

In step S8, the own-vehicle route generation unit 49 and the vehicle control unit 50 control traveling of the own vehicle according to the target inter-vehicle distance and the target lateral position set in step S1. This processing causes shielding avoidance control performed by the shielding avoidance control unit 48 to be suppressed. Subsequently, the process is terminated.

On the other hand, when the image capturing possibility determination unit 52 determines that the own vehicle 1 is positioned in the imaging-enabled area in step S7 (step S7: Y), the process proceeds to step S9.

In step S9, the control amount setting unit 53 determines whether or not the traffic light recognition unit 47 recognizes the traffic light. When the control amount setting unit 53 determines that the traffic light recognition unit 47 recognizes the traffic light (step S9: Y), the process proceeds to step S10. When the control amount setting unit 53 determines that the traffic light recognition unit 47 does not recognize the traffic light (step S9: N), the process proceeds to step S12.

In step S10, the control amount setting unit 53 determines whether or not the preceding vehicle detection unit 45 recognizes a preceding vehicle 2.

When the control amount setting unit 53 determines that the preceding vehicle detection unit 45 recognizes the preceding vehicle 2 (step S10: Y), the process proceeds to step S11. In step S11, the control amount setting unit 53 determines that the current inter-vehicle distance is an inter-vehicle distance at which the traffic light is not shielded from the range of the angle of view of the camera 20 by the preceding vehicle and sets the current inter-vehicle distance as a target inter-vehicle distance in such a way as to maintain the current inter-vehicle distance. Subsequently, the process proceeds to step S8.

In step S8, the own-vehicle route generation unit 49 and the vehicle control unit 50 control speed of the own vehicle 1 in such a way as to maintain the current inter-vehicle distance set as the target inter-vehicle distance. Subsequently, the process is terminated.

On the other hand, when the control amount setting unit 53 determines that the preceding vehicle detection unit 45 does not recognize the preceding vehicle 2 in step S10 (step S10: N), the process proceeds to step S8.

In step S8, the own-vehicle route generation unit 49 and the vehicle control unit 50 control traveling of the own vehicle according to the target inter-vehicle distance and the target lateral position set in step S1. Subsequently, the process is terminated.

In step S12, the control amount setting unit 53 determines whether or not the preceding vehicle detection unit 45 recognizes a preceding vehicle 2. When the control amount setting unit 53 determines that the preceding vehicle detection unit 45 recognizes the preceding vehicle 2 (step S12: Y), the process proceeds to step S13.

In step S13, the control amount setting unit 53 calculates an inter-vehicle distance at which the traffic light is not shielded by the preceding vehicle and sets the calculated inter-vehicle distance as a target inter-vehicle distance. This processing causes the target inter-vehicle distance to increase.

In addition, the control amount setting unit 53 sets a target lateral position that causes lateral positional deviation between the own vehicle and the preceding vehicle to increase. Subsequently, the process proceeds to step S8.

In step S8, the own-vehicle route generation unit 49 and the vehicle control unit 50 cause the own vehicle 1 to decelerate in such a way that the inter-vehicle distance between the own vehicle 1 and the preceding vehicle coincides with the target inter-vehicle distance set by the control amount setting unit 53.

Alternatively, the own-vehicle route generation unit 49 and the vehicle control unit 50 steer the own vehicle 1 in such a way that the lateral position of the own vehicle 1 is changed to the target lateral position. Subsequently, the process is terminated.

On the other hand, when the control amount setting unit 53 determines that the preceding vehicle detection unit 45 does not detect the preceding vehicle 2 in step S12 (step S12: N), the process proceeds to step S14.

In step S14, the control amount setting unit 53 sets a position that is further from the traffic light than the other among a near end of an imaging-enabled area and a stop line as a target stop position. Subsequently, the process proceeds to step S8.

In step S8, the own-vehicle route generation unit 49 and the vehicle control unit 50 cause the own vehicle 1 to stop at the target stop position. Subsequently, the process is terminated.

Advantageous Effects of Embodiment (1) The traffic light recognition unit 47 recognizes a traffic light, based on an image captured by the camera 20 imaging a predetermined range of the angle of view in front of the own vehicle 1. The map acquisition unit 42 acquires map information including information of an installation position of a traffic light and information of a lane that is controlled by the traffic light. The imaging-enabled area calculation unit 51 calculates an imaging-enabled area in which an image of the traffic light can be captured on the lane by the camera 20, based on the range of the angle of view of the camera 20 mounted on the own vehicle 1 and the map information. The image capturing possibility determination unit 52 determines whether or not the own vehicle 1 is positioned in the imaging-enabled area.

When the own vehicle 1 is positioned in the imaging-enabled area, the control amount setting unit 53, the own-vehicle route generation unit 49, and the vehicle control unit 50 control the own vehicle 1 in such a way that the traffic light is not shielded from the range of the angle of view of the camera 20 by a preceding vehicle of the own vehicle 1.

This configuration enables the shielding avoidance control to be prevented from being unnecessarily executed in an area in which, even when no other vehicle exists on the lane, an image of the traffic light cannot be captured by the camera 20 originally. As a result, it is possible to suppress a sense of discomfort from being unnecessarily given to a passenger of the own vehicle 1 by the shielding avoidance control.

(2) The control amount setting unit 53 determines whether or not a traffic light is recognized from a captured image captured by the camera 20, and, when the traffic light is recognized from the captured image, the own-vehicle route generation unit 49 and the vehicle control unit 50 control the own vehicle in such a way as to maintain the inter-vehicle distance between a preceding vehicle and the own vehicle at an inter-vehicle distance at which the traffic light is not shielded by the preceding vehicle.

This configuration enables the own vehicle 1 to be controlled in such a way that the traffic light is not shielded by the preceding vehicle.

(3) The control amount setting unit 53 determines whether or not a traffic light is recognized from a captured image captured by the camera 20 and determines whether or not a preceding vehicle exists. When the own vehicle 1 is positioned in an imaging-enabled area, the traffic light is not recognized from a captured image, and a preceding vehicle exists, the control amount setting unit 53, the own-vehicle route generation unit 49, and the vehicle control unit 50 control the own vehicle 1 in such a way as to increase inter-vehicle distance between the preceding vehicle and the own vehicle 1.

This configuration enables the own vehicle 1 to be controlled in such a way that the traffic light is not shielded by the preceding vehicle.

(4) The control amount setting unit 53 calculates an inter-vehicle distance at which a traffic light is not shielded by a preceding vehicle. The own-vehicle route generation unit 49 and the vehicle control unit 50, by decelerating the own vehicle 1 according to the inter-vehicle distance, increase the inter-vehicle distance between the preceding vehicle and the own vehicle.

This configuration enables speed of the own vehicle 1 to be controlled in such a way that the traffic light is not shielded by the preceding vehicle.

(5) The control amount setting unit 53, the own-vehicle route generation unit 49, and the vehicle control unit 50 steer the own vehicle 1 in such a way as to increase lateral positional deviation between the own vehicle 1 and a preceding vehicle in a direction in which the traffic light is deviated away from the center of the lane.

This configuration enables the own vehicle 1 to be steered in such a way that the traffic light is not shielded by the preceding vehicle.

(6) When a traffic light cannot be recognized from a captured image even when a relative position of the own vehicle 1 with respect to a preceding vehicle is controlled, the control amount setting unit 53, the own-vehicle route generation unit 49, and the vehicle control unit 50 cause the own vehicle 1 to stop at a position that is further from the traffic light than the other among a stop line corresponding to the traffic light and a closest point to the traffic light in an imaging-enabled area.

Because of this configuration, when a traffic light cannot be recognized due to a factor other than a preceding vehicle, such as a photographing condition and a device state, it is possible to cause the own vehicle 1 to stop at a point at which the traffic light is positioned in a range of the angle of view of the camera 20 within a range where the own vehicle does not cross the stop line. This configuration enables the own vehicle 1 to be stopped at a position at which an image of the traffic light can be captured when the situation gets better.

(7) The control amount setting unit 53 determines whether or not a traffic light is recognized from a captured image captured by the camera 20 and determines whether or not a preceding vehicle exists. When a traffic light is not recognized from the captured image and no preceding vehicle exists, the control amount setting unit 53, the own-vehicle route generation unit 49, and the vehicle control unit 50 cause the own vehicle 1 to stop at a position that is further from the traffic light than the other among a stop line corresponding to the traffic light and a closest point to the traffic light in an imaging-enabled area.

Because of this configuration, when a traffic light cannot be recognized due to a factor other than a preceding vehicle, such as a photographing condition and a device state, it is possible to cause the own vehicle 1 to stop at a point at which the traffic light is positioned in a range of the angle of view of the camera 20 within a range where the own vehicle does not cross the stop line. This configuration enables the own vehicle 1 to be stopped at a position at which an image of the traffic light can be captured when the situation gets better.

(8) The map acquisition unit 42 acquires information of installation positions of a plurality of traffic lights controlling traffic on a lane, from map information. The imaging-enabled area calculation unit 51 calculates an imaging-enabled area with respect to each of the plurality of traffic lights. When the own vehicle 1 is positioned in any of the imaging-enabled areas, the control amount setting unit 53, the own-vehicle route generation unit 49, and the vehicle control unit 50 control the own vehicle 1 in such a way that the traffic light is not shielded from the range of the angle of view of the camera 20 by a preceding vehicle.

Since it is only required to control the own vehicle 1 in such a way that any of the plurality of traffic lights is not shielded, the number of alternatives in travel control of the own vehicle 1 increases.

(9) The imaging-enabled area calculation unit 51 calculates an imaging-enabled area with respect to each of a plurality of lanes controlled by a traffic light.

Since it is only required to control the own vehicle 1 in such a way that the traffic light is not shielded on any of the plurality of lanes, the number of alternatives in the travel control of the own vehicle 1 increases.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Own vehicle
2 Preceding vehicle
3 Traffic light
10 Vehicle Control Device
11 Object sensor
12 Vehicle sensor
13 Positioning device
14 Map database
15 Communication device
17 Navigation system
18 Controller
19 Actuator
20 Camera
21 Processor
22 Storage device
40 Object detection unit
41 Own-vehicle position estimation unit
42 Map acquisition unit
43 Detection integration unit
44 Object tracking unit
45 Preceding vehicle detection unit
46 Position-in-map calculation unit
47 Traffic light recognition unit
48 Shielding avoidance control unit
49 Own-vehicle route generation unit
51 Vehicle control unit
51 Imaging-enabled area calculation unit
52 Image capturing possibility determination unit
53 Control amount setting unit

The invention claimed is:

1. A method for controlling a vehicle in which a camera configured to capture an image of a predetermined range of an angle of view in front of an own vehicle is mounted on the own vehicle and a traffic light is recognized based on an image captured by the camera, the method comprising:
based on map information including information of an installation position of the traffic light and information of a lane controlled by the traffic light and a range of the angle of view of the camera mounted on the own vehicle, calculating an imaging-enabled area in which an image of the traffic light can be captured on the lane by the camera;
determining whether or not the own vehicle is positioned in the imaging-enabled area; and
when the own vehicle is positioned in the imaging-enabled area, controlling the own vehicle in such a way that the traffic light is not shielded from the range of the angle of view of the camera by a preceding vehicle of the own vehicle.

2. The method for controlling the vehicle according to claim 1 comprising:
determining whether or not the traffic light is recognized from a captured image captured by the camera; and
when the traffic light is recognized from the captured image, controlling the own vehicle in such a way as to maintain inter-vehicle distance between the preceding vehicle and the own vehicle at an inter-vehicle distance at which the traffic light is not shielded by the preceding vehicle.

3. The method for controlling the vehicle according to claim 1 comprising:
determining whether or not the traffic light is recognized from a captured image captured by the camera;
determining whether or not the preceding vehicle exists; and
when the own vehicle is positioned in the imaging-enabled area, the traffic light is not recognized from the captured image, and the preceding vehicle exists, controlling the own vehicle in such a way as to increase inter-vehicle distance between the preceding vehicle and the own vehicle.

4. The method for controlling the vehicle according to claim 3, wherein the method, by calculating an inter-vehicle distance at which the traffic light is not shielded by the preceding vehicle and decelerating the own vehicle according to the inter-vehicle distance, increases an inter-vehicle distance between the preceding vehicle and the own vehicle.

5. The method for controlling the vehicle according to claim 3 comprising steering the own vehicle in such a way as to increase lateral positional deviation between the own vehicle and the preceding vehicle in a direction in which the traffic light is deviated away from a center of the lane.

6. The method for controlling the vehicle according to claim 3, wherein, when the traffic light cannot be recognized from the captured image even when a relative position of the own vehicle with respect to the preceding vehicle is controlled, the method causes the own vehicle to stop at a position, the position being further from the traffic light than another among a stop line corresponding to the traffic light and a closest point to the traffic light in the imaging-enabled area.

7. The method for controlling the vehicle according to claim 1 comprising:
   determining whether or not the traffic light is recognized from a captured image captured by the camera;
   determining whether or not the preceding vehicle exists; and
   when the traffic light is not recognized from the captured image and the preceding vehicle does not exist, causing the own vehicle to stop at a position, the position being further from the traffic light than another among a stop line corresponding to the traffic light and a closest point to the traffic light in the imaging-enabled area.

8. The method for controlling the vehicle according to claim 1, wherein
   the method calculates the imaging-enabled area with respect to each of a plurality of traffic lights controlling the lane, and
   when the own vehicle is positioned in any imaging-enabled areas, the method controls the own vehicle in such a way that the traffic light is not shielded from the range of the angle of view of the camera by the preceding vehicle.

9. The method for controlling the vehicle according to claim 1, wherein the method calculates the imaging-enabled area with respect to each of a plurality of lanes controlled by the traffic light.

10. A vehicle control device comprising:
    a camera mounted on an own vehicle and configured to capture an image of a predetermined range of an angle of view in front of the own vehicle; and
    a controller configured to calculate, based on map information including information of an installation position of a traffic light and information of a lane controlled by the traffic light and a range of the angle of view of the camera, an imaging-enabled area in which an image of the traffic light can be captured on the lane by the camera, determine whether or not the own vehicle is positioned in the imaging-enabled area, control the own vehicle in such a way that the traffic light is not shielded from the range of the angle of view of the camera by a preceding vehicle of the own vehicle when the own vehicle is positioned in the imaging-enabled area, and recognize the traffic light, based on an image captured by the camera.

* * * * *